US012691520B2

(12) United States Patent　　　　　(10) Patent No.: US 12,691,520 B2
Cui et al.　　　　　　　　　　　　　　(45) Date of Patent:　　Jul. 28, 2026

(54) METHOD FOR GENERATING A PATH FOR WIRE ARC ADDITIVE MANUFACTURING

(71) Applicant: HanKaiSi Intelligent Technology Co., Ltd., Guizhou, Guiyang (CN)

(72) Inventors: Qiang Cui, Guiyang (CN); Jiangshan Li, Guiyang (CN); Siddharth Suhas Pawar, Pune (IN); Chuan Yu, Guiyang (CN)

(73) Assignee: HanKaiSi Intelligent Technology Co., Ltd., Guizhou, Guiyang (CN)

( * ) Notice: Subject to any disclaimer, the term of this patent is extended or adjusted under 35 U.S.C. 154(b) by 719 days.

(21) Appl. No.: 18/121,472

(22) Filed: Mar. 14, 2023

(65) Prior Publication Data

US 2023/0219158 A1　　Jul. 13, 2023

Related U.S. Application Data

(63) Continuation of application No. PCT/CN2021/117962, filed on Sep. 13, 2021.

(30) Foreign Application Priority Data

Sep. 14, 2020　(CN) .......................... 202010962181.1

(51) Int. Cl.
B23K 9/095　　　(2006.01)
B23K 9/04　　　(2006.01)
　　　　　(Continued)

(52) U.S. Cl.
CPC .............. B23K 9/0953 (2013.01); B23K 9/04 (2013.01); B33Y 10/00 (2014.12); B33Y 50/02 (2014.12);
　　　　　(Continued)

(58) Field of Classification Search
None
See application file for complete search history.

(56) References Cited

U.S. PATENT DOCUMENTS

2018/0370145 A1　12/2018　Woytowitz
2020/0282497 A1 *　9/2020　Yamasaki ............. B22F 10/366

FOREIGN PATENT DOCUMENTS

CN　　105772905 A　*　7/2016　............. B23K 9/032
CN　　107856309 A　　3/2018
　　　　(Continued)

OTHER PUBLICATIONS

International Search Report of PCT/CN2021/117962.
Written Opinion of PCT/CN2021/117962.

*Primary Examiner* — John J Norton

(57)　　　　　ABSTRACT

A method for generating a path for wire arc additive manufacturing is provided in this disclosure, which relates to the technical field of additive manufacturing, and includes following steps: generating a model in which a three-dimensional model is established according to angle constraint of the wire arc additive manufacturing; layering the model in which the three-dimensional model is layered along a height direction; selecting discrete points in which a plurality of discrete points are selected according to curve curvature for different layers of the model; obtaining coordinates of the discrete points; determining a printing direction; obtaining coordinates of the discrete points and corresponding printing directions; and generating a control program. The method according to the disclosure is simple, has a wide application range, can satisfy printing of complex shapes, and can serve to well form for structures with maximum printing inclination of 60 degrees, thus improving forming effect of printing.

10 Claims, 10 Drawing Sheets

(51) Int. Cl.

| | | |
|---|---|---|
| *B33Y 10/00* | (2015.01) | |
| *B33Y 50/02* | (2015.01) | |
| *G06F 30/10* | (2020.01) | |
| *G06F 111/04* | (2020.01) | |
| *G06F 111/10* | (2020.01) | |
| *G06F 113/10* | (2020.01) | |
| *B23K 103/00* | (2006.01) | |

(52) U.S. Cl.
     CPC .......... *G06F 30/10* (2020.01); *B23K 2103/50*
         (2018.08); *G06F 2111/04* (2020.01); *G06F*
         *2111/10* (2020.01); *G06F 2113/10* (2020.01)

(56)                    References Cited

FOREIGN PATENT DOCUMENTS

| CN | 110560837 A | 12/2019 |
|---|---|---|
| CN | 112149198 A | 12/2020 |

* cited by examiner

1100

METHOD FOR GENERATING A PATH FOR WIRE ARC ADDITIVE MANUFACTURING

CROSS-REFERENCE TO RELATED APPLICATIONS

This application is a bypass continuation application of PCT Application No. PCT/CN2021/117962, filed Sep. 13, 2021, and from the Chinese patent application 202010962181.1 filed Sep. 14, 2020, the content of which are incorporated herein in the entirety by reference.

TECHNICAL FIELD

The disclosure relate to the technical field of additive manufacturing, in particular to a method for generating a path for wire arc additive manufacturing.

BACKGROUND ART

Wire Arc Additive Manufacturing (WAAM) is an advanced digital manufacturing technology to form metal parts gradually from line to surface to body under control of programs according to a three-dimensional digital model with a layer-by-layer cladding principle by using an arc generated by melt inert-gas welding (MIG), tungsten inert-gas arc welding (TIG) and plasma welding PA or other welding machines as a heat source and adding a wire. It not only has advantages of high deposition efficiency, high wire utilization rate, short manufacturing cycle, low cost, less restrictions on a part size and ease of repairing, but also has an ability of in-situ composite manufacturing and forming large-size parts.

At present, three-dimensional solid parts are built by layer-by-layer addition in the wire arc additive manufacturing, and a horizontal slicing method is mostly adopted in path planning and design of the wire arc additive manufacturing, which exhibits following shortcomings in practice: 1) this method is mainly suitable for FDM printers with three degrees of freedom, in which xzy coordinates are obtained but without printing direction information; 2) there are strict requirements on an angle of a welding torch, which is prone to arc breakdown and forms printing perforation defects, and because a printing direction of a robot is the same at each point, this method cannot be used to print a structure with large inclination, with a maximum inclination of 15 to 20; and 3) when printing complex structures, a moving speed of the robot can't be consistent due to change in trajectory curvature, which has a certain impact on printing quality (surface texture). Therefore, it is a problem necessary to be solved in the field of wire arc additive manufacturing to provide a method suitable for generating a path for wire arc additive manufacturing with a complex shape and a wider inclination range.

A method for wire arc additive manufacturing is disclosed in a patent document titled "A Method for Wire Arc Additive Manufacturing" (CN108723549A), which includes following steps: (1) selecting a corresponding heat source type, a forming wire and a substrate material type according to material requirements of a target part to be formed; (2) establishing a CAD geometric model of the target part to be formed, extracting a STL model, slicing the STL model, generating a G code file needed for printing, and transmitting the G code to the printer; (3) setting printing parameters, starting printing equipment, and printing metal thin layers in a layer-by-layer manner according to a planned path; (4) extinguishing the welding torch when printing of all of the layers are finished by the printer, so as to obtain the target part to be formed. An additive part printed by the method according to this disclosure has advantages of small error, no crack, good surface quality, and is with a stable process, high dimensional accuracy and surface quality, short processing period and low cost. The printing process is closed-loop controlled, with high degree of automation, which can reduce workload of operators, can be capable of continuously manufacturing and has high manufacturing efficiency. Although with the patent technical scheme described above, change in printing inclination angle in arc additive manufacturing can be achieved, but this method is only for products with a uniform inclination angle and is not suitable for different components with complex shapes, and its operation process is complicated and has limitations.

SUMMARY

In order to solve problems existing in related art, a method for generating a path for wire arc additive manufacturing suitable for products with complex shapes is provided in the disclosure.

The method for generating the path for wire arc additive manufacturing is provided in this disclosure, which includes following steps:

S1, generating a model in which a three-dimensional model is established according to angle constraint of the wire arc additive manufacturing;

S2, layering the model in which the three-dimensional model is layered along a height direction;

S3, selecting discrete points in which a plurality of discrete points are selected according to curve curvature for different layers of the model;

S4, obtaining coordinates of the discrete points in which a tangent of the curve at a discrete point is set as an X axis, and a normal at the discrete point to a curved surface is set as a Y axis, the X axis and the Y axis constituting a point plane, and a normal direction of the point plane is set as a Z axis;

S5, determining a printing direction in which a reverse direction of a vector c obtained by adding a unit vector a of the Z axis in step S4 to a unit vector b of a world-coordinate Z0 axis is determined as the printing direction of an arc welding tool head;

S6, sequentially obtaining coordinates of the selected plurality of discrete points and corresponding printing directions according to the steps S3 and S4; and S7, writing a motion instruction according to robot grammar rules, and adding an arc welding start instruction before the motion instruction and adding an arc welding stop instruction after the motion instruction so as to generate a control program.

Further, a direction offset coefficient n is set according to complexity of a structure of the three-dimensional model in step S5, the printing direction of the arc welding tool head is a reverse direction of a vector c obtained by adding the unit vector a of the Z axis in step S4 to a product of the unit vector b of the world-coordinate $Z_0$ axis multiplied by the direction offset coefficient n (i.e. $\vec{a} + n*\vec{b} = \vec{c}$), and the more complex the structure of the three-dimensional model is, the greater a value of the direction offset coefficient n is.

Further, the direction offset coefficient n ranges from 0.1 to 1.

Further, the three-dimensional model in the step S1 is a triangular mesh model.

Further, a thickness of each of the layers in layering in the step S2 ranges from 0.5 to 3.5 mm.

Further, in the step S3, arc welding starting points of different layers are randomly determined.

Further, the greater the curve curvature in step S3, the smaller a distance between selected discrete points, and the distance between the discrete points is from 1 to 3 mm.

Further, the motion instruction of step S7 is written according to the coordinates of the discrete points and the corresponding printing directions.

Further, this method is mainly applied to metal 3D printing manufacturing.

Further, the method is mainly implemented by a Rhino software.

Compared with the related art, the disclosure has following advantages.

1. In the disclosure, printing directions of the arc welding tool heads at different discrete points are determined in the path planning process. In the related art, path generation of arc additive manufacturing generally is made with a path planning method of layering along a horizontal direction, and only world coordinates of printing points can be determined in a printing process, but the printing direction of the arc welding tool head cannot be independently planned and designed, and further maximum printing inclination of the arc additive manufacturing technology adopted in the related art cannot be over 20 degrees from a world-coordinate $Z_0$ axis. Only products with relatively simple structures can be printed. In the disclosure, a model layering method in a vertical direction is adopted, the tangent of the discrete point on the curve is set as the X axis, a normal at the discrete point to the curved surface is set as the Y axis, the X axis and the Y axis constitute a point plane, a normal of the point plane is set as the Z axis, and the reverse direction of the vector c obtained by adding the unit vector a of the Z axis to the unit vector b of the world-coordinate $Z_0$ axis is determined as the printing direction of the arc welding tool head. The disclosure is different from the related art in that while determining the coordinates of discrete point, the printing direction of the arc welding tool head corresponding to the discrete point can be further independently determined, and a method for determining the printing direction of the arc welding tool head is provided; in addition, the method for determining the printing direction of the arc welding tool head has simple steps, which enables more wide application of the arc additive manufacturing technology, with a maximum printing inclination reaching 60 degrees, more complicated shapes of printed products and a large application range.

2. In this disclosure, the direction offset coefficient n is set according to complexity of the structure of the three-dimensional model, and when determining the printing direction of the arc welding tool head, the unit vector b of the world-coordinate $Z_0$ axis is multiplied by the direction offset coefficient n, and then is added to the unit vector a of the discrete-point Z axis, so that the printing direction of the arc welding tool head can be offset at a certain angle from an original printing direction, and the more complex the structure of the three-dimensional model is, the greater a value of the direction offset coefficient n is, In this way, large-range change in an angle of the arc welding tool head can be reduced, and problems of jamming or jumping errors of a printing robot arm caused by excessive change in the angle of the arc welding tool head, which breaks through a speed limit of the printing robot arm and causes stalling, can be avoided.

3. In this disclosure, the greater the curve curvature, the smaller the distance between selected discrete points, and the greater a number of discrete points. Meanwhile, the distance between discrete points is set to be from 1 to 3 mm, thus avoiding a situation that forming quality is affected due to a too large spacing, and a data file is huge and cannot be read by the robot due to a too small spacing. In addition, when printing using ordinary arc additive manufacturing technologies is affected by the curvature, a surface texture of a printed product is poor due to uneven distribution of discrete points. However, with this disclosure, the number of discrete points can be freely selected according to curvature change, thus effectively overcoming the above situation, and finally the printed product has more obvious forming effect and better quality.

BRIEF DESCRIPTION OF THE DRAWINGS

In order to explain technical schemes of the present disclosure more clearly, the drawings required in the description of embodiments will be briefly introduced below; obviously, the drawings related to this disclosure in the following description are only some embodiments of the present disclosure, and other drawings can be obtained according to these drawings by those of ordinary skill in the art without paying creative labor.

DETAILED DESCRIPTION

In the following, the technical scheme in the embodiment of the disclosure will be described in detail in connection with the drawings; obviously, the described embodiment is intended to be only a part of the embodiment of the disclosure, but not all of them. On a basis of the embodiments in this disclosure, all other embodiments obtained by the ordinary skilled in the art without any creative effort are within the protection scope of this disclosure.

Figure 1:
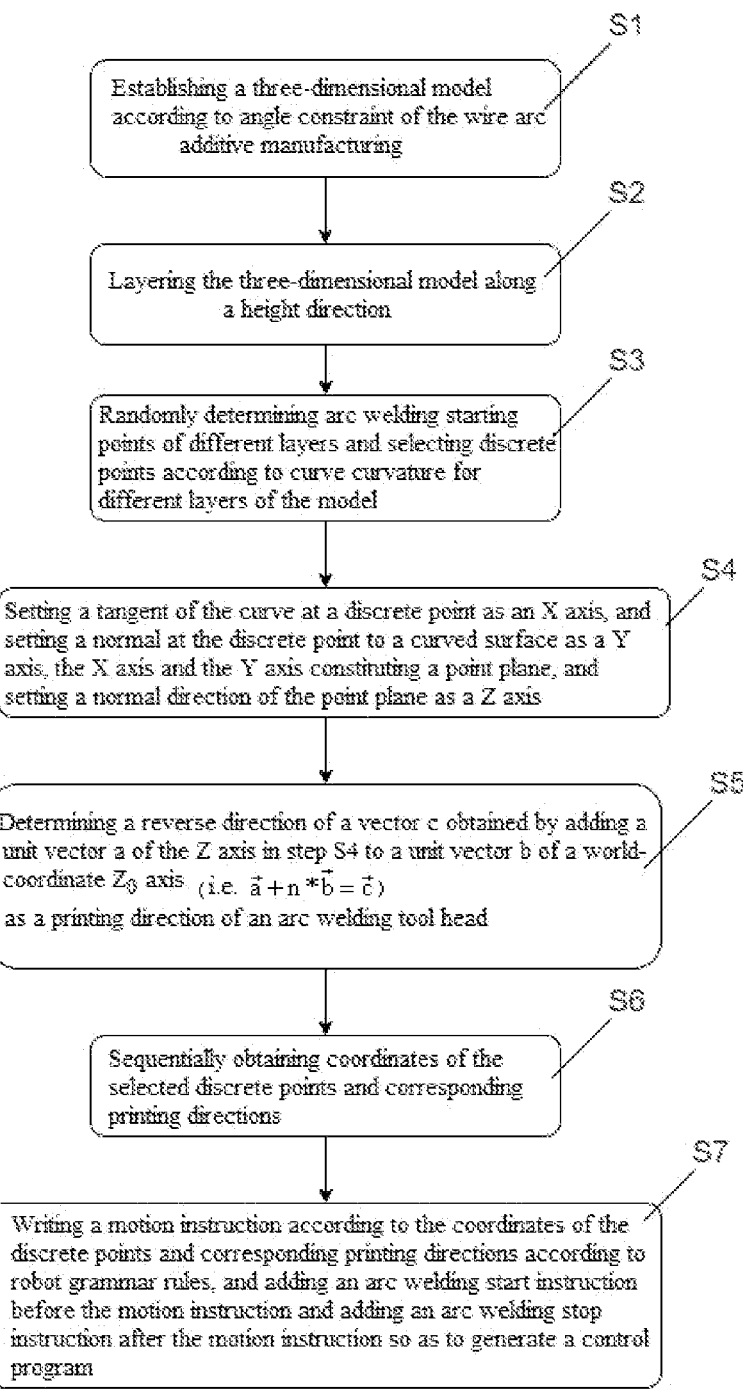
FIG. 1 is a schematic flow diagram according to the present disclosure.

As shown in FIG. 1, a method for generating a path for wire arc additive manufacturing is provided in this disclosure, which includes following steps:

S1, generating a model in which a three-dimensional model is established according to angle constraint of the wire arc additive manufacturing;

S2, layering the model in which the three-dimensional model is layered along a height direction;

S3, selecting discrete points in which a plurality of discrete points are selected according to curve curvature for different layers of the model;

S4, obtaining coordinates of the discrete points in which a tangent of the curve at a discrete point is set as an X axis, and a normal at the discrete point to a curved surface is set as a Y axis, the X axis and the Y axis constituting a point plane, and a normal direction of the point plane is set as a Z axis;

S5, determining a printing direction in which a reverse direction of a vector c obtained by adding a unit vector a of the Z axis in step S4 to a unit vector b of a world-coordinate $Z_0$ axis is determined as the printing direction of an arc welding tool head;

S6, sequentially obtaining coordinates of the selected plurality of discrete points and corresponding printing directions according to the steps S3 and S4; and S7, writing a motion instruction according to robot grammar rules, and adding an arc welding start instruction before the motion instruction and adding an arc welding stop instruction after the motion instruction so as to generate a control program.

In the related art, path generation of arc additive manufacturing generally is made with a path planning method of layering along a horizontal direction, and only world coordinates of printing points can be determined in a printing process, but the printing direction of the arc welding tool head cannot be independently planned and designed, and further maximum printing inclination of the arc additive manufacturing technology adopted in the related art cannot be over 20 degrees from a world-coordinate $Z_0$ axis. Only products with relatively simple structures can be printed. In the disclosure, a model layering method in a vertical direction is adopted, the tangent of the discrete point on the curve is set as the X axis, a normal at the discrete point to the curved surface is set as the Y axis, the X axis and the Y axis constitute a point plane, a normal of the point plane is set as the Z axis, and the reverse direction of the vector c obtained by adding the unit vector a of the Z axis to the unit vector b of the world-coordinate $Z_0$ axis is determined as the printing direction of the arc welding tool head. The disclosure is different from the related art in that while determining the coordinates of discrete point, the printing direction of the arc welding tool head corresponding to the discrete point can be further independently determined, and a method for determining the printing direction of the arc welding tool head is provided; in addition, the method for determining the printing direction of the arc welding tool head has simple steps, which enables more wide application of the arc additive manufacturing technology, with a maximum printing inclination reaching 60 degrees, more complicated shapes of printed products and a large application range.

A direction offset coefficient n is set according to complexity of a structure of the three-dimensional model in step S5, the printing direction of the arc welding tool head is a reverse direction of a vector c obtained by adding the unit vector a of the Z axis in step S4 to a product of the unit vector b of the world-coordinate $Z_0$ axis multiplied by the direction offset coefficient n (i.e. $\vec{a}+n*\vec{b}=\vec{c}$), and the more complex the structure of the three-dimensional model is, the greater a value of the direction offset coefficient n is.

In this disclosure, the direction offset coefficient n is set according to complexity of the structure of the three-dimensional model, and when determining the printing direction of the arc welding tool head, the unit vector b of the world-coordinate $Z_0$ axis is multiplied by the direction offset coefficient n, and then is added to the unit vector a of the discrete-point Z axis, so that the printing direction of the arc welding tool head can be offset at a certain angle from an original printing direction, and the more complex the structure of the three-dimensional model is, the greater a value of the direction offset coefficient n is, In this way, large-range change in an angle of the arc welding tool head can be reduced, and problems of jamming or jumping errors of a printing robot arm caused by excessive change in the angle of the arc welding tool head, which breaks through a speed limit of the printing robot arm and causes stalling, can be avoided.

The direction offset coefficient n ranges from 0.1 to 1, and the direction offset coefficient n of the disclosure ranges from 0.1 to 1, so as to ensure that the printing direction is proximate to a normal direction at the discrete point to the curved surface, which facilitates better printing operation of the arc welding tool head.

The three-dimensional model in the step S1 is a triangular mesh model, which facilitates better determination of the normal direction at the discrete point to the curved surface.

A thickness of each of the layers in layering in the step S2 ranges from 0.5 to 3.5 mm, and the thickness of each of the layers in layering is determined according to an arc welding current and a diameter of the printing material. The greater the current, the smaller the thickness of the layer, and the greater the diameter of the printing material, the larger the thickness of the layer, so as to ensure quality of the finished product manufactured by arc welding additive manufacturing. A layering thickness can be determined by those skilled in the art according to an actual arc welding current and material diameter.

In the step S3, arc welding starting points of different layers are randomly determined to ensure that not all of arc welding starting points of different layers are adjacent to each other, which is beneficial to avoid a problem that surface quality of finished products is poor due to material accumulation at the starting point caused by same starting points.

The greater the curve curvature in step S3, the smaller a distance between selected discrete points, and the distance between the discrete points is from 1 to 3 mm. In this disclosure, the greater the curve curvature, the smaller the distance between selected discrete points, and the greater a number of discrete points. Meanwhile, the distance between discrete points is set to be from 1 to 3 mm, thus avoiding a situation that forming quality is affected due to a too large spacing, and a data file is huge and cannot be read by the robot due to a too small spacing. In addition, when printing using ordinary arc additive manufacturing technologies is affected by the curvature, a surface texture of a printed product is poor due to uneven distribution of discrete points and less discrete points with large curvature being selected. However, with this disclosure, the number of discrete points can be freely selected according to curvature change, thus effectively overcoming the above situation, and finally the printed product has more obvious forming effect and better quality.

The motion instruction of the step S7 is written according to the coordinates of the discrete points and the corresponding printing directions. The coordinates of the discrete points in the disclosure can be selected as absolute coordinates obtained based on a world coordinate system or relative coordinates determined based on the relative coordinate system of the discrete point.

The method is mainly applied to metal 3D printing manufacturing, and the disclosure is mainly applied to the field of arc welding additive manufacturing, and printing materials used are mainly metal materials.

The method is mainly implemented by a Rhino software, and those skilled in the art can use Rhino's grasshopper visual programming software to write related programs according to actual printing requirements so as to realize technical schemes of the disclosure.

Embodiments

The method for generating the path for wire arc additive manufacturing is provided in this disclosure, which includes following steps S1 to S7.

Figure 2:
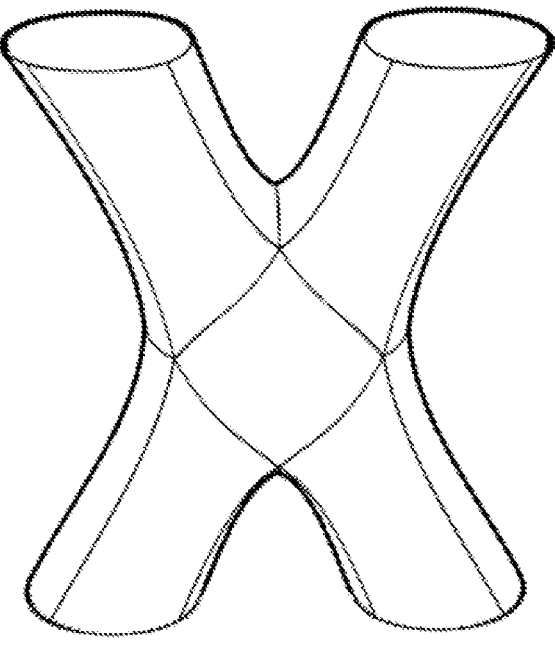
FIG. 2 is a three-dimensional schematic diagram of step S1 according to the present disclosure.

In step S1, as shown in FIG. 2, model generation is carried out, in which a three-dimensional model is established according to angle constraint of the wire arc fuse additive manufacturing, preferably the finally established three-dimensional model is a triangular mesh model.

Figure 3:
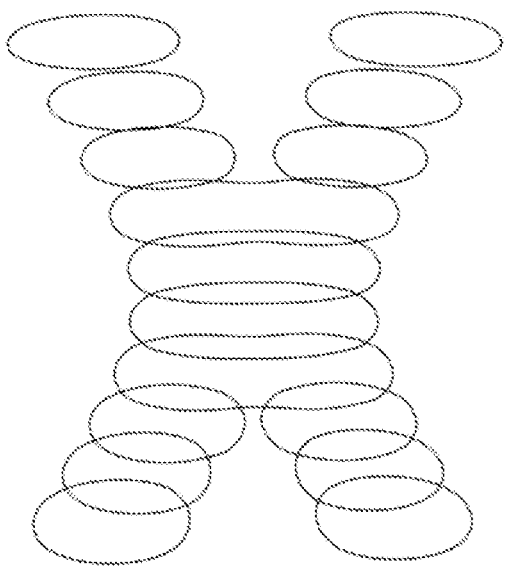
FIG. 3 is a schematic diagram of model layering in step S2 model according to the present disclosure.

In step S2, as shown in FIG. 3, the model is layered in which the three-dimensional model is layered along a height direction, that is, layered along a world-coordinate $Z_0$ axis. The layering is made in an order from low to high according to an arc welding sequence, and a layering thickness in layering is determined according to the arc welding current and a diameter of the printing material. The greater the current, the smaller the thickness of the layer, and the greater the diameter of the printing material. while ensuring the forming effect, a thickness of each layer is determined to be from 0.5 to 3.5 mm.

Figure 4:
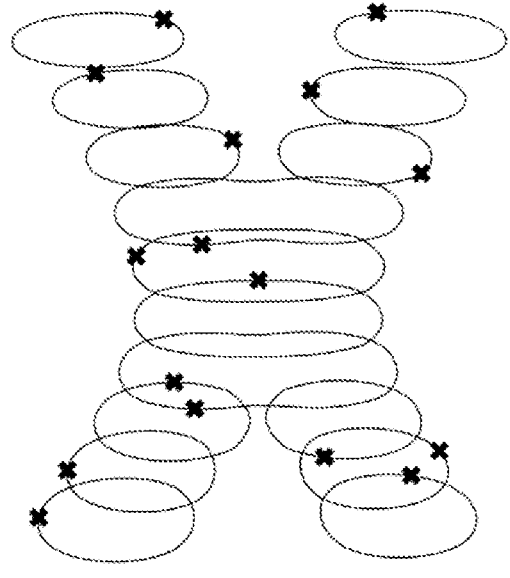
FIG. 4 is a schematic diagram of arc welding starting point selection in step S3 according to the present disclosure.
Figure 5:
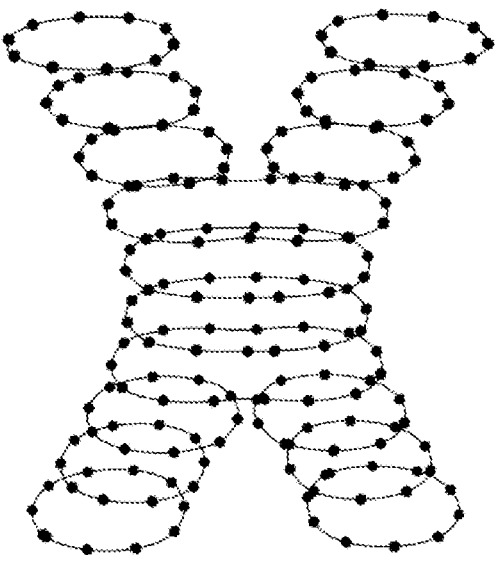
FIG. 5 is a schematic diagram of discrete point selection in step S3 according to the present disclosure.

In step S3, discrete points are selected, as shown in FIG. 4, arc welding starting points of different layers are randomly determined to ensure that different arc welding starting points are not adjacent to each other, as shown in FIG. 5. A plurality of discrete points are selected according to curve curvature for different layers of the model. The greater the curve curvature, the smaller the distance between selected discrete points, and the greater a number of discrete points, and the distance between discrete points is set to be from 1 to 3 mm.

Figure 6:
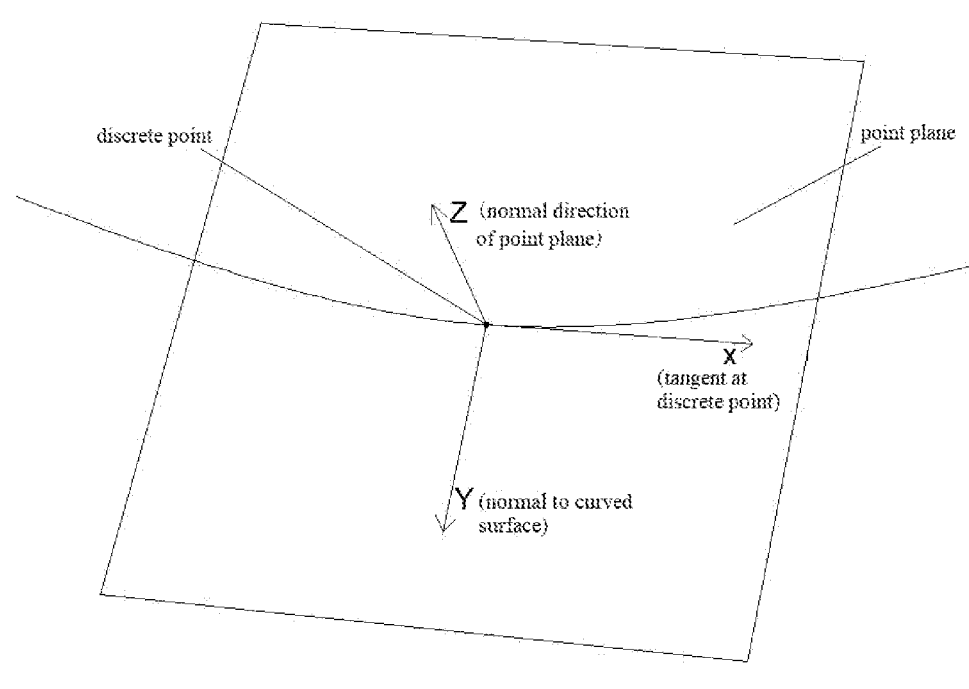
FIG. 6 is a schematic diagram of obtaining of coordinates of a discrete point in step S4 according to the present disclosure.

In step S4, as shown in FIG. 6, coordinates of the discrete points are obtained in which a tangent of the curve at a discrete point is set as an X axis, and a normal at the discrete point to a curved surface is set as a Y axis, the X axis and the Y axis constituting a point plane, and a normal direction of the point plane is set as a Z axis.

Figure 7A:
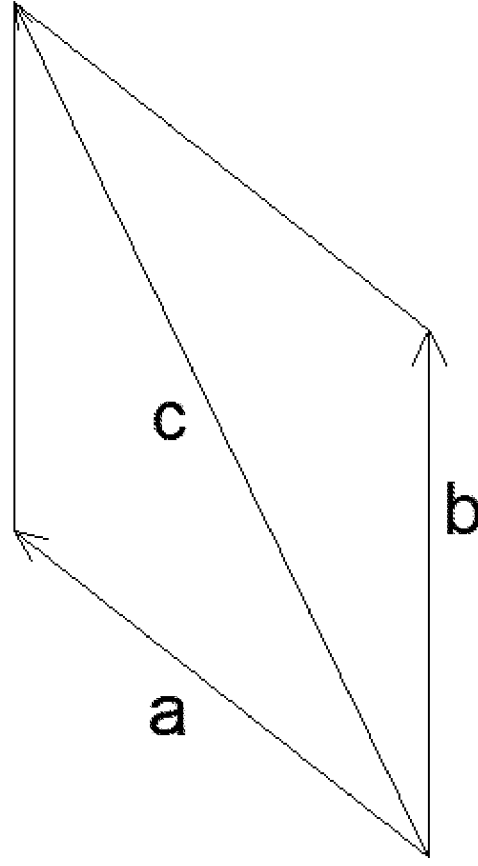
FIG. 7A is a schematic diagram for confirming a arc welding printing direction in step S5 according to the present disclosure.
Figure 7B:
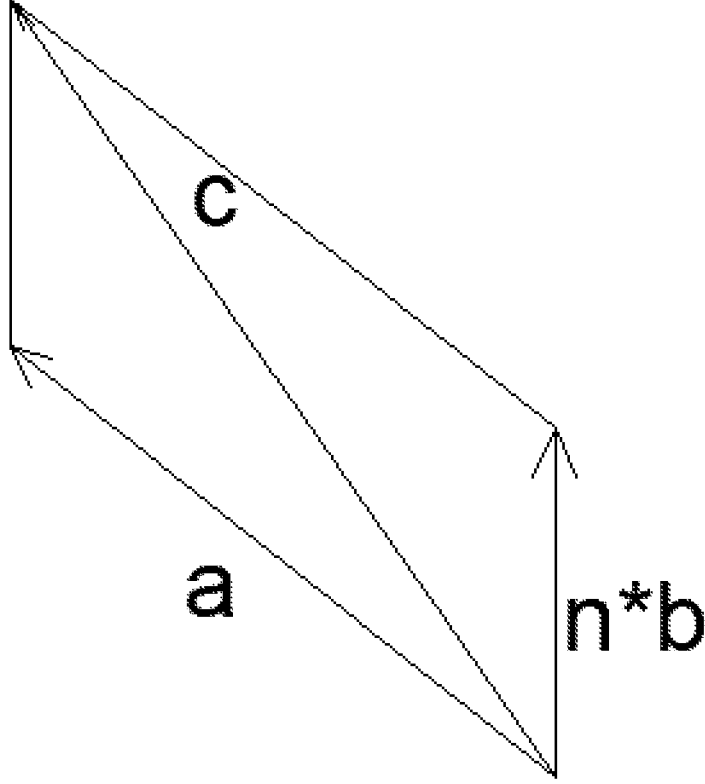
FIG. 7B is a schematic diagram for confirming an arc welding printing direction after introducing the direction offset coefficient in step S5 according to the present disclosure.

In step S5, a printing direction is determined, as shown in FIG. 7B, a reverse direction of a vector c obtained by adding a product of a unit vector b of the world-coordinate $Z_0$ axis multiplied by a direction offset coefficient n to a unit vector a of the Z axis in step S4 is determined as a printing direction of an arc welding tool head. The direction offset coefficient n is determined according to complexity and curvature of the three-dimensional model structure, and the more complicated the structure is, the larger the curvature is and the smaller a value of the direction offset coefficient n is, and the arc welding printing direction is proximate to a normal direction at the discrete point to the curved surface, and the value of the direction offset coefficient n ranges from 0.1 to 1.

Figure 8:
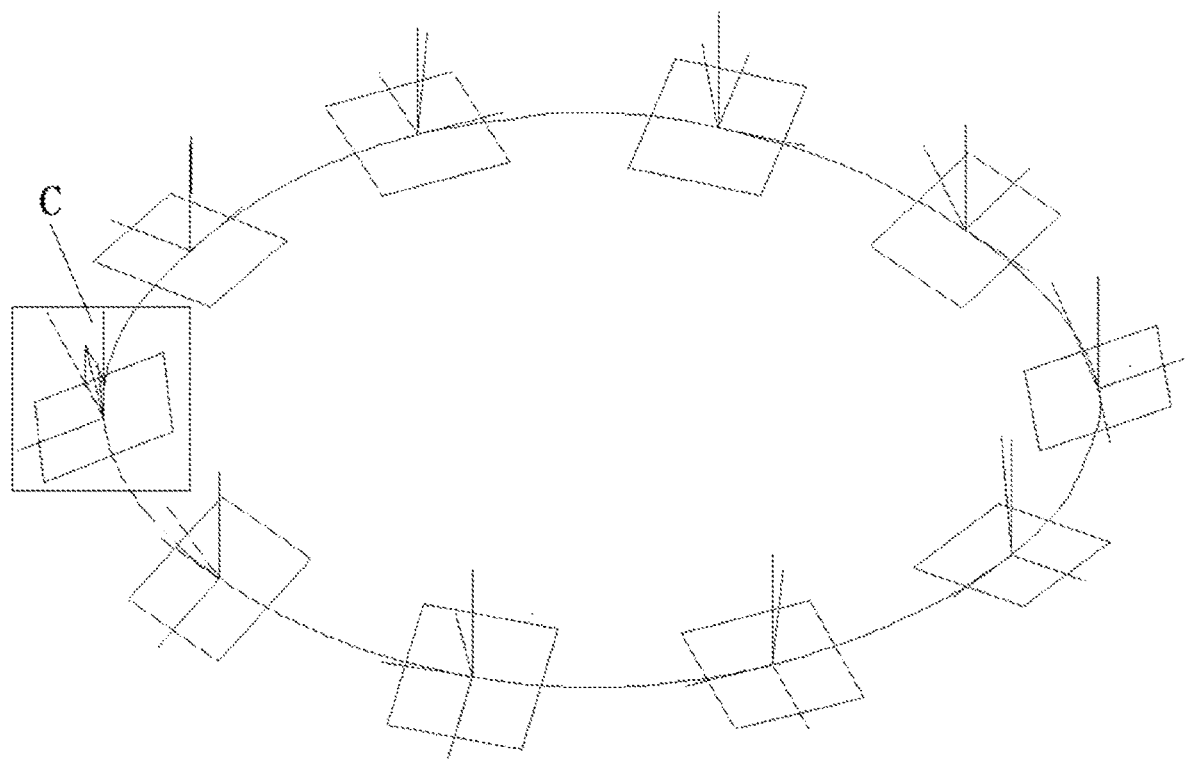
FIG. 8 is a schematic diagram of obtaining of the coordinates of discrete points of the model and the arc welding printing direction in step S7 according to the present disclosure.
Figure 9:
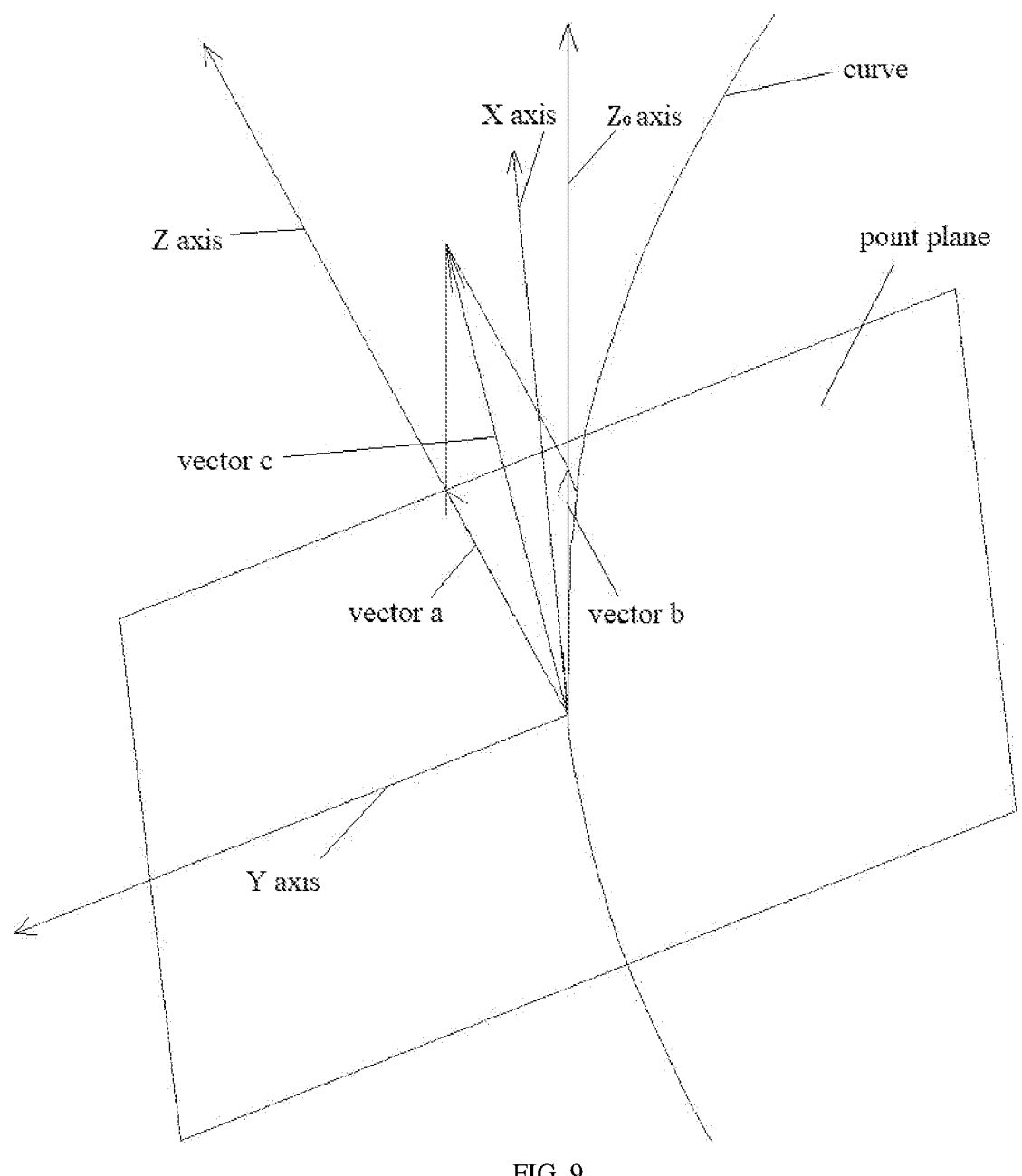
FIG. 9 is a partially enlarged schematic view at C in FIG. 8.
Figure 10:
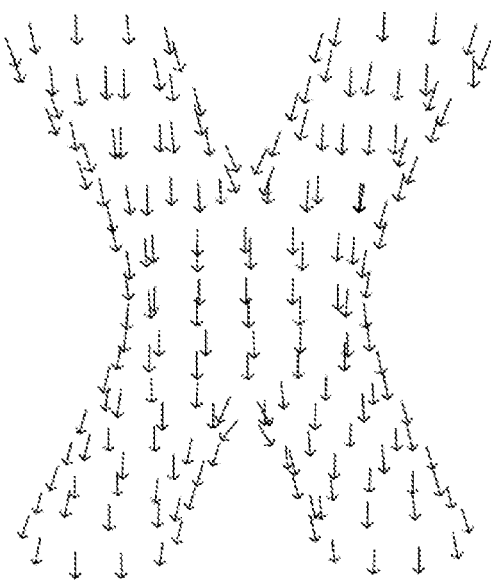
FIG. 10 is a schematic diagram of determining of the arc welding printing direction of discrete points of the product in step S6 according to the present disclosure.

In step S6, coordinates of the selected plurality of discrete points and corresponding printing directions are sequentially obtained according to the steps S3 and S4, as shown in FIGS. 8 to 10.

In step S7, a motion instruction is written according to the coordinates of the discrete points and corresponding printing directions according to robot grammar rules, and an arc welding start instruction is added before the motion instruction and an arc welding stop instruction is added after the motion instruction so as to generate a control program.

Figure 11:
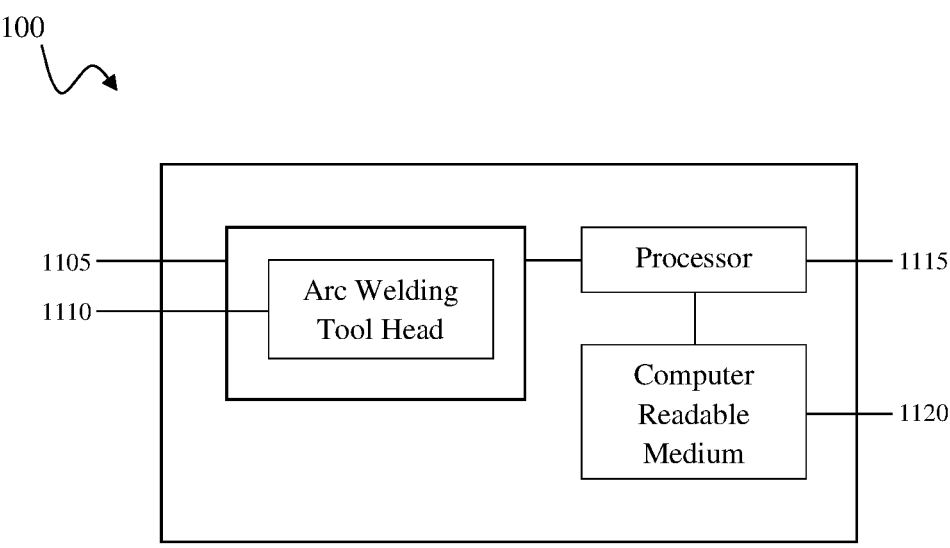
FIG. 11 is a block diagram of a wire arc additive manufacturing printer according to the present disclosure.

With reference to FIG. 11, wire arc additive manufacturing (WAAM) printer 1100 is configured to utilize the control program generated in step S7 to print a product according to the three-dimensional model of step S1. WAAM printer 1100 includes printing robot arm 1105, processor 1115, and non-transitory computer readable medium 1120, where printing robot arm 1105 including arc welding tool head 1110. In the preferred embodiment, WAAM printer 1100 may be used with any weldable material, including, but not limited to, titanium, steels, stainless steel, aluminum, nickel alloys, etc.

The basic principles, main features and advantages of the present disclosure are shown and described in the above. It should be understood by those skilled in the art that the disclosure is not limited by the embodiments described above, and what is described in the above-described embodiments and descriptions is only intended to illustrate principles of the present disclosure. There will be various changes and improvements in the present disclosure without departing from spirit and scope of the present disclosure, which fall within the scope of the claimed disclosure. The claimed scope of the disclosure is define by appended claims and their equivalents.

The invention claimed is:

1. A method for generating a path for wire arc additive manufacturing (WAAM), comprising following steps:

S1, generating a model in which a three-dimensional model is established according to angle constraint of the wire arc additive manufacturing;

S2, layering the model in which the three-dimensional model is layered along a height direction;

S3, selecting discrete points in which a plurality of discrete points are selected according to curve curvature for different layers of the model;

S4, obtaining coordinates of the discrete points in which a tangent of the curve at one of the discrete points is set as an X axis, and a normal at the one of the discrete points to a curved surface is set as a Y axis, the X axis and the Y axis constituting a point plane, and a normal direction of the point plane is set as a Z axis;

S5, determining a printing direction in which a reverse direction of a vector c obtained by adding a unit vector a of the Z axis in step S4 to a unit vector b of a world-coordinate $Z_0$ axis is determined as the printing direction of an arc welding tool head;

S6, sequentially obtaining coordinates of the selected plurality of discrete points and corresponding printing directions according to the steps S3 and S4; and S7, writing a motion instruction according to robot grammar rules, and adding an arc welding start instruction before the motion instruction and adding an arc welding stop instruction after the motion instruction so as to generate a control program;

wherein the control program is configured to be stored on a non-transitory computer readable medium and the control program is executed by a processor of a WAAM printer to produce a product according to the three-dimensional model of S1;

the WAAM printer comprises a printing robotic arm; and the printing robotic arm comprises the arc welding tool head.

2. The method for generating the path for wire arc additive manufacturing according to claim 1, wherein a direction offset coefficient n is set according to complexity of a structure of the three-dimensional model in step S5, the printing direction of the arc welding tool head is a reverse direction of a vector c obtained by adding the unit vector a of the Z axis in step S4 to a product of the unit vector b of the world-coordinate $Z_0$ axis multiplied by the direction offset coefficient n (i.e. $\vec{a}+n*\vec{b}=\vec{c}$), and the more complex the structure of the three-dimensional model is, the greater a value of the direction offset coefficient n is.

3. The method for generating the path for wire arc additive manufacturing according to claim 2, wherein the direction offset coefficient n ranges from 0.1 to 1.

4. The method for generating the path for wire arc additive manufacturing according to claim 1, wherein the three-dimensional model in step S1 is a triangular mesh model.

5. The method for generating the path for wire arc additive manufacturing according to claim 1, wherein a thickness of each of the layers in layering in the step S2 ranges from 0.5 to 3.5 mm.

6. The method for generating the path for wire arc additive manufacturing according to claim 1, wherein in the step S3, arc welding starting points of different layers are randomly determined.

7. The method for generating the path for wire arc additive manufacturing according to claim 1, wherein the greater the curve curvature in step S3, the smaller a distance between selected discrete points, and the distance between the discrete points is from 1 to 3 mm.

8. The method for generating the path for wire arc additive manufacturing according to claim 1, wherein the motion instruction of step S7 is written according to the coordinates of the discrete points and the corresponding printing directions.

9. The method for generating the path for wire arc additive manufacturing according to claim 1, wherein the method is applied to metal 3D printing manufacturing.

10. The method for generating the path for wire arc additive manufacturing according to claim 1, wherein the method is implemented by a 3D computer graphics and computer-aided design (CAD) application software.

* * * * *